US012281494B2

(12) United States Patent
Overbey

(10) Patent No.: US 12,281,494 B2
(45) Date of Patent: Apr. 22, 2025

(54) BOLT INDICATOR

(71) Applicant: Schlage Lock Company LLC, Carmel, IN (US)

(72) Inventor: James W. Overbey, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 98 days.

(21) Appl. No.: 17/492,052

(22) Filed: Oct. 1, 2021

(65) Prior Publication Data

US 2023/0107083 A1 Apr. 6, 2023

(51) Int. Cl.
*E05B 41/00* (2006.01)
*E05B 65/10* (2006.01)

(52) U.S. Cl.
CPC .......... *E05B 41/00* (2013.01); *E05B 65/1053* (2013.01)

(58) Field of Classification Search
CPC ............................. E05B 41/00; E05B 65/1053
USPC .......................................................... 292/195
See application file for complete search history.

(56) References Cited

U.S. PATENT DOCUMENTS 747,252 A * 12/1903 Smith .................... E05B 41/00 40/907
4,262,507 A 4/1981 Flack et al.
4,494,783 A 1/1985 Poe
4,895,400 A * 1/1990 Harding .................... E05C 1/04 292/145
6,883,357 B1 4/2005 Cheng
8,002,317 B2 8/2011 Satram et al.
8,356,844 B2 1/2013 Baic et al.
8,419,088 B2 4/2013 Baic et al.
8,720,116 B1 * 5/2014 Ahmad ................. E05B 1/0053 16/431
9,273,495 B2 3/2016 Tien
9,435,141 B2 * 9/2016 Tien ........................ E05B 41/00
10,450,778 B2 10/2019 Bennett et al.
10,550,601 B2 * 2/2020 Baumgarte ........... E05B 47/023
11,401,734 B2 * 8/2022 Miller ..................... E05B 55/12
2006/0226660 A1 10/2006 Wu
2011/0016938 A1 1/2011 Chi
2015/0007623 A1 * 1/2015 Alghamdi ................. E05C 1/04 292/137

(Continued)

FOREIGN PATENT DOCUMENTS

AU 2015280130 A1 2/2017
AU 2018223218 A1 9/2019

(Continued)

*Primary Examiner* — Eugene G Byrd
*Assistant Examiner* — James Edward Ignaczewski
(74) *Attorney, Agent, or Firm* — Taft Stettinius & Hollister LLP

(57) ABSTRACT

An exemplary access control device is configured for mounting to a door and includes a bolt, an actuator, and an indicator. The bolt has an extended position and a retracted position, and includes a front face that is visible when the bolt is extended and the door is in a closed position. The actuator is operable to move the bolt from the extended position to the retracted position. The indicator is positioned on the front face of the bolt such that at least a portion of the indicator is visible when the bolt is extended and the door is in the closed position.

20 Claims, 6 Drawing Sheets

(56) References Cited

U.S. PATENT DOCUMENTS

| | | | | |
|---|---|---|---|---|
| 2015/0315816 | A1* | 11/2015 | Gopalakrishnan | E05B 55/005<br>70/344 |
| 2016/0130846 | A1* | 5/2016 | Shah | E05C 1/14<br>292/138 |
| 2018/0305953 | A1* | 10/2018 | Thompson | E05B 15/10 |
| 2019/0368226 | A1* | 12/2019 | Sweeney | E05B 15/02 |
| 2020/0032554 | A1* | 1/2020 | Berger | E05B 9/02 |

FOREIGN PATENT DOCUMENTS

| | | | |
|---|---|---|---|
| EP | 3656677 | A1 | 5/2020 |
| JP | 06787927 | B2 | 11/2020 |
| NZ | 538561 | A | 1/2009 |

* cited by examiner

BOLT INDICATOR

TECHNICAL FIELD

The present disclosure generally relates to indicators for access control devices, and more particularly but not exclusively relates to exit devices including such indicators.

BACKGROUND

Exit devices are commonly mounted to the egress side of a door in order to selectively retain the door in a closed position. In many facilities, a security guard or other personnel will tour the facility to ensure that all doors have been secured in their closed positions to prevent ingress of unauthorized persons. Because this touring often occurs during nighttime hours, it can be difficult for the personnel to accurately determine whether the latchbolt is extended to secure the door in its closed position without approaching the exit device. For these reasons among others, there remains a need for further improvements in this technological field.

SUMMARY

An exemplary access control device is configured for mounting to a door and includes a bolt, an actuator, and an indicator. The bolt has an extended position and a retracted position, and includes a front face that is visible when the bolt is extended and the door is in a closed position. The actuator is operable to move the bolt from the extended position to the retracted position. The indicator is positioned on the front face of the bolt such that at least a portion of the indicator is visible when the bolt is extended and the door is in the closed position. Further embodiments, forms, features, and aspects of the present application shall become apparent from the description and figures provided herewith.

DETAILED DESCRIPTION OF ILLUSTRATIVE EMBODIMENTS

Figure 1:
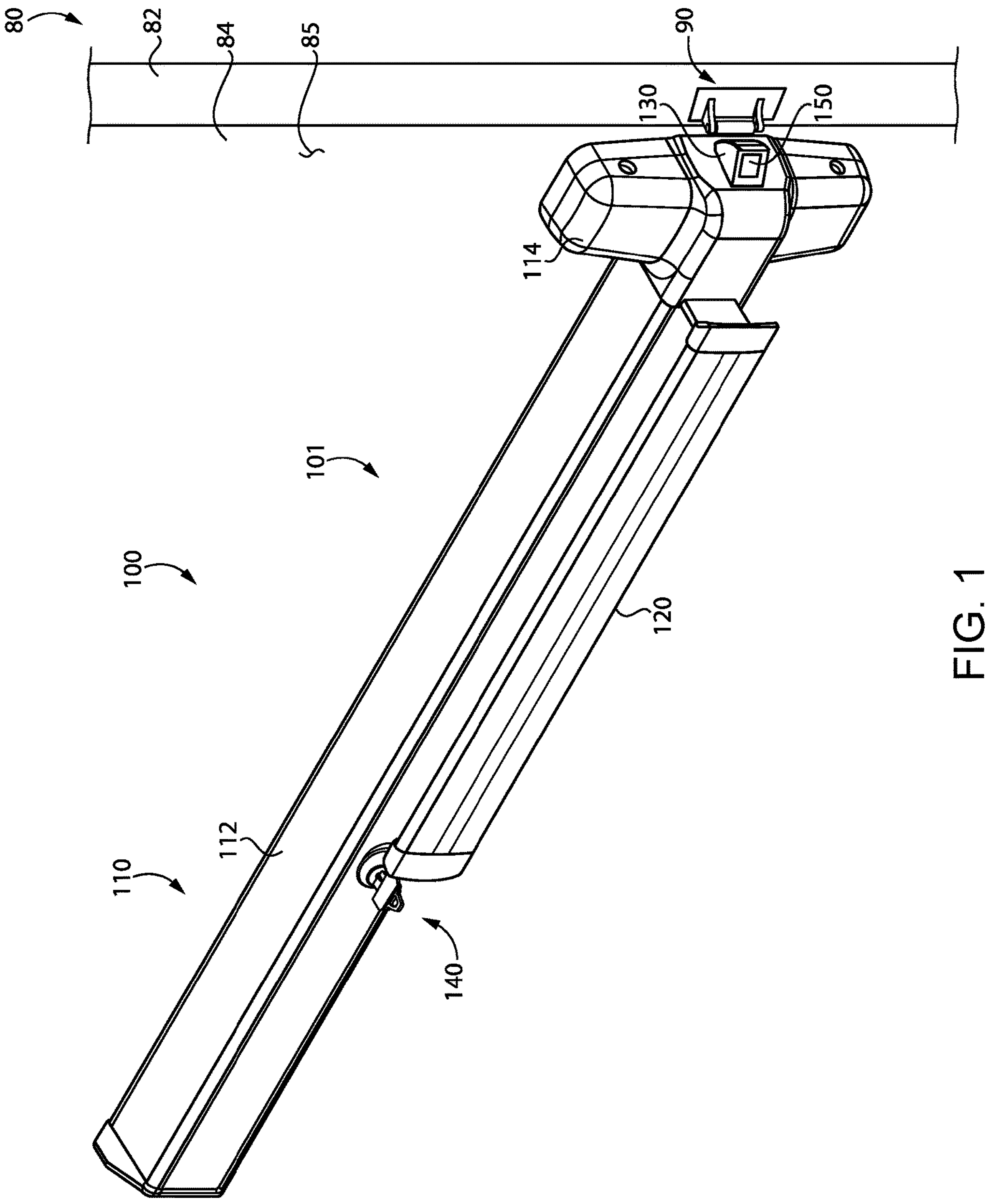
FIG. 1 is a perspective view of a closure assembly according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a closure assembly 80 according to certain embodiments. The closure assembly 80 generally includes a doorframe 82, a door 84 swingingly mounted to the doorframe 82, a strike 90 mounted to the doorframe 82, and an access control device in the form of an exit device 100 mounted to an egress side 85 of the door 84. As described herein, the door 84 is operable to swing relative to the doorframe 82 between an open position and a closed position, and the exit device 100 is operable to engage the strike 90 to selectively retain the door 84 in its closed position.

Figure 2:
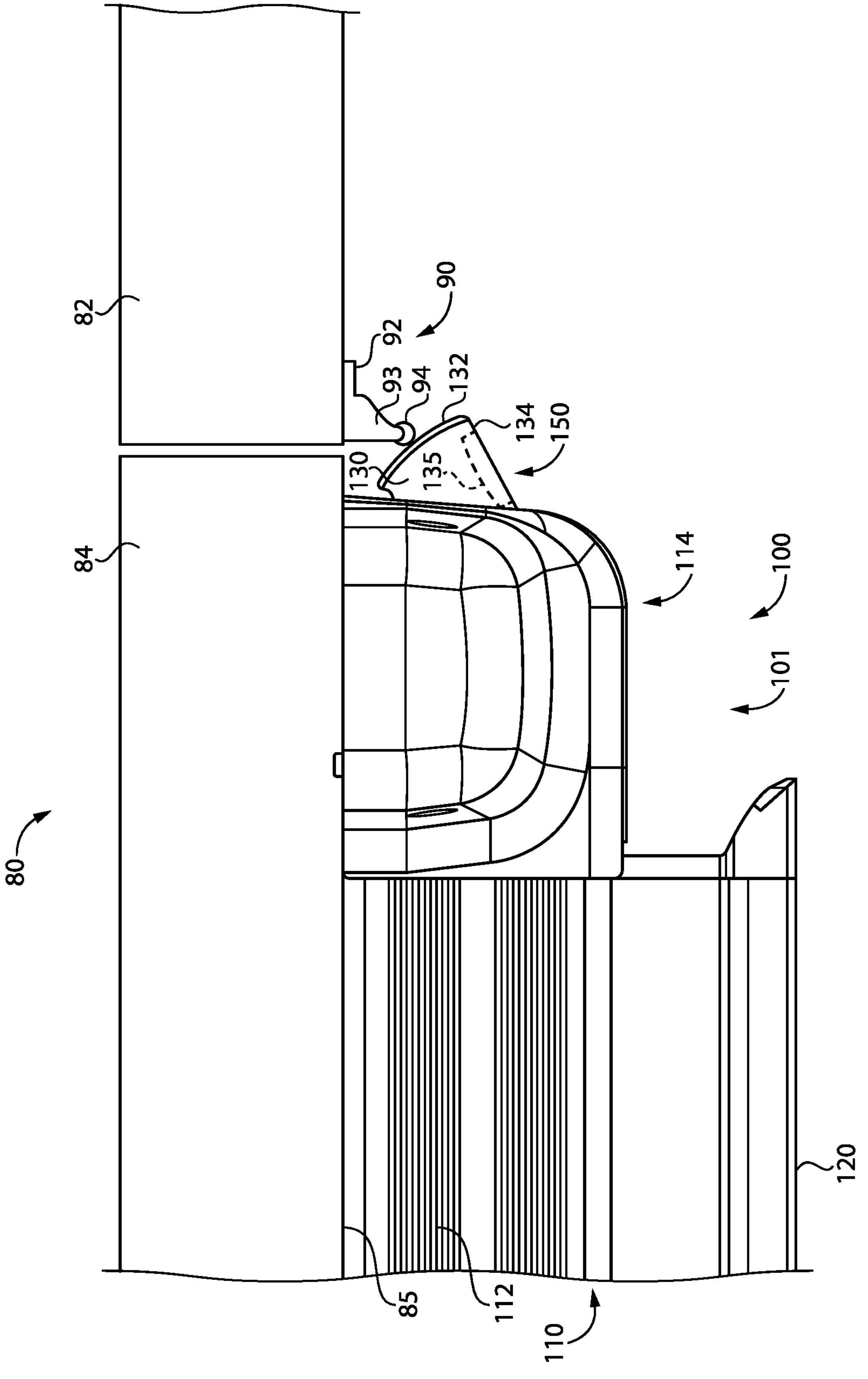
FIG. 2 is a top-down view of a portion of the closure assembly, and illustrates a latchbolt of an exit device engaged with a strike.

With additional reference to FIG. 2, the illustrated strike 90 generally includes a mounting plate 92 including a pair of arms 93, and a roller 94 rotatably mounted to the arms 93. As described herein, the roller 94 is operable to engage a latchbolt 130 of the exit device 100 when the latchbolt 130 is extended to aid in retaining the door 84 in its closed position. While the illustrated strike 90 includes a roller 94, it is also contemplated that strikes according to other embodiments may engage the latchbolt 130 in other manners, which may not necessarily involve the use of rollers.

The illustrated exit device 100 comprises a rim-format pushbar assembly 101, and generally includes a mounting assembly 110 configured for mounting to the door 84, a pushbar 120 movably mounted to the mounting assembly 110, and a latchbolt 130 operably connected with the pushbar 120 such that the pushbar 120 is operable to retract the latchbolt 130. In certain embodiments, the exit device 100 may further include a dogging mechanism 140 operable to selectively retain the exit device 100 in an actuated state. As described herein, the illustrated exit device 100 also includes an indicator 150 configured to provide a visual indication regarding the extended/retracted position of the latchbolt 130.

The mounting assembly 110 generally includes a channel member 112 and a header case 114 positioned at one end of the channel member 112. The pushbar 120 is movably mounted to the mounting assembly 110, and is partially received in the channel member 112 when the pushbar 120 is in its depressed position. In the illustrated form, the pushbar assembly 101 includes the latchbolt 130, which is mounted for extension from and retraction into the header case 114.

As noted above, the pushbar 120 is movably mounted to the mounting assembly 110 and is operably connected with the latchbolt 130. The pushbar 120 has a projected or deactuated position and a depressed or actuated position, and may be biased toward the projected or deactuated position. When the pushbar 120 is driven to the depressed position (e.g., manually or by an electrically-actuated driver of the exit device 100), the exit device 100 drives the latchbolt 130 from an extended position in which the latchbolt 130 is operable to engage the strike 90 to retain the door 84 in its closed position, to a retracted position in which the latchbolt 130 is operable to clear the strike 90 to permit opening of the door 84. Such actuation of a latchbolt 130 by a pushbar 120 is known in the art, and need not be described in further detail herein.

Figure 3:
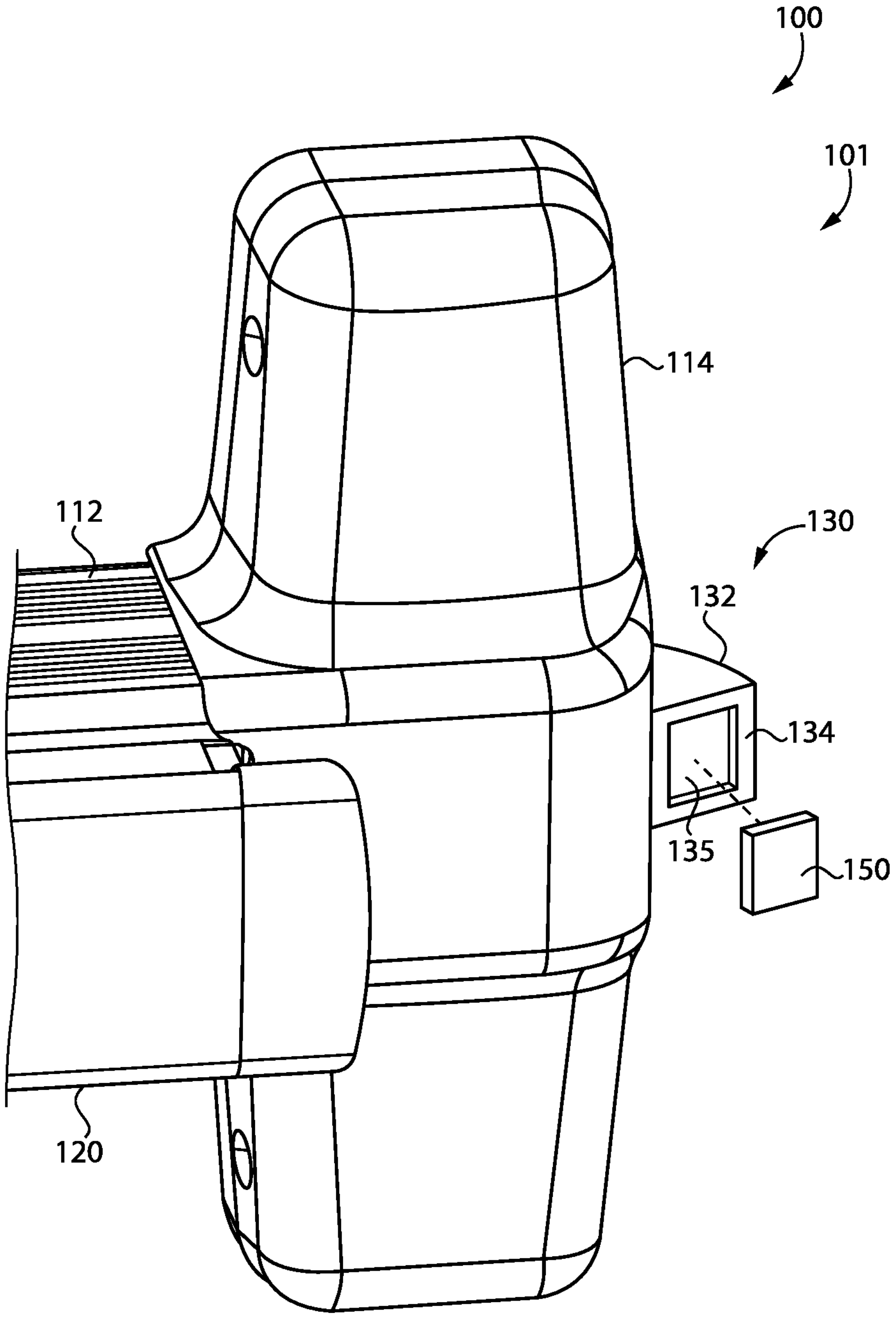
FIG. 3 is a partially-exploded perspective view of a portion of the exit device.

With additional reference to FIG. 3, the latchbolt 130 has a strike-facing or rear face 132 and a user-facing or front face 134 opposite the rear face 132. When the door 84 is closed and the latchbolt 130 is in its extended position, the rear face 132 is operable to engage the roller 94, and the front face 134 faces outward, or toward users approaching the exit device 100 from the egress side 85 of the door 84. As described herein, in certain embodiments, the front face 134 may include a recess 135 operable to receive the indicator 150.

In embodiments that include the dogging mechanism 140, the dogging mechanism 140 is operable to selectively retain the exit device 100 in its actuated state, in which the pushbar 120 is depressed and the latchbolt 130 is retracted. Such a dogging mechanism 140 may, for example, be placed in its dogging state during business hours or other times of public access to ensure that the door 84 remains capable of being opened from the non-egress side. The dogging mechanism 140 may then be placed in its non-dogging state during closing hours or other times of restricting public access to discourage or prevent the door 84 from being opened from the non-egress side. In the illustrated form, the dogging mechanism 140 is key-actuated. In other forms, the dogging mechanism 140 may be actuated by an Allen wrench, or may include a manual actuator. It is also contemplated that the dogging mechanism 140 may be omitted.

The indicator 150 is mounted to the front face 134 of the latchbolt 130 such that the indicator 150 is visible by users approaching the egress side 85 of the door 84 when the door 84 is closed and the latchbolt 130 is in its extended position. In certain embodiments, such as those in which the front face 134 of the latchbolt 130 includes a recess 135, the indicator 150 may be seated in the recess. As described herein, the indicator 150 is configured to increase visibility of the latchbolt 130 to aid users in determining whether the latchbolt 130 is extended or retracted.

In certain existing exit devices, the latchbolt is a dark color and/or of a similar color as at least a portion of the strike 90. This fact can exacerbate the difficulties of personnel touring the facility to ensure that the latchbolt is extended to secure the door in the closed position, particularly during nighttime hours. As described herein, however, this difficulty may be alleviated by the provision of the indicator 150.

In certain embodiments, the indicator 150 provides a visual contrast with the nearby components (e.g., the latchbolt 130 and/or at least a portion of the strike 90) in order to aid the touring personnel in determining whether the latchbolt 130 is extended to secure the door 84 in its closed position. For example, the indicator 150 may be more easily visible than the remainder of the front face 134 in darkened environments.

In certain embodiments, the front face 134 of the latchbolt 130 is a first color, and the indicator 150 is a second color different from the first color. In certain embodiments, the color of the indicator 150 is lighter and/or brighter than the color of the latchbolt 130. In certain embodiments, the indicator 150 may comprise a fluorescent material.

In certain embodiments, the indicator 150 comprises a retroreflective material, for example of the type used on safety vests and/or the type used in roadway lane markers. In such forms, the touring personnel may shine a flashlight down the hallway leading to the closure assembly 80, and viewing a brightly reflective area may indicate to the personnel that the latchbolt 130 is extended.

In certain embodiments, the indicator 150 may glow in the dark. For example, the indicator 150 may comprise a photoluminescent material that absorbs energy when the main lights in the vicinity of the closure assembly 80 are on, and that emits visible light when the main lights in the vicinity of the closure assembly 80 are turned off. In such forms, the presence of a glow may indicate to the touring personnel that the latchbolt 130 is extended.

As noted above, in certain embodiments, the front face 134 of the latchbolt 130 may comprise a recess 135 in which the indicator 150 is seated. In some such forms, the depth of the recess 135 may correspond to the thickness of the indicator 150 such that the front face of the indicator 150 is substantially flush with the remainder of the front face 134 of the latchbolt 130. It is also contemplated that the recess 135 may be omitted, and that the indicator 150 may instead be mounted to a flat front face 134 of the latchbolt 130. Such may be the case, for example, in embodiments in which the indicator 150 is relatively thin and/or covers a majority of the front face 134 of the latchbolt 130.

In certain embodiments, the indicator 150 may be a rigid member. In such forms, the rigid indicator 150 may be secured to the front face 134 via one or more of an adhesive, an epoxy, a mechanical fastener, and/or other mechanisms operable to secure a rigid indicator 150 to the front face 134. In certain forms, a rigid indicator 150 may be press-fit into the recess 135.

In certain embodiments, the indicator 150 may be flexible. For example, the indicator 150 may comprise an adhesive tape that is adhered to the front face 134 of the latchbolt 130.

In certain embodiments, the indicator 150 may be provided in the form of a surface treatment applied to the front face 134 of the latchbolt 130. By way of example, the indicator 150 may be applied as a paint, an epoxy, or another form of surface treatment.

Figure 5:
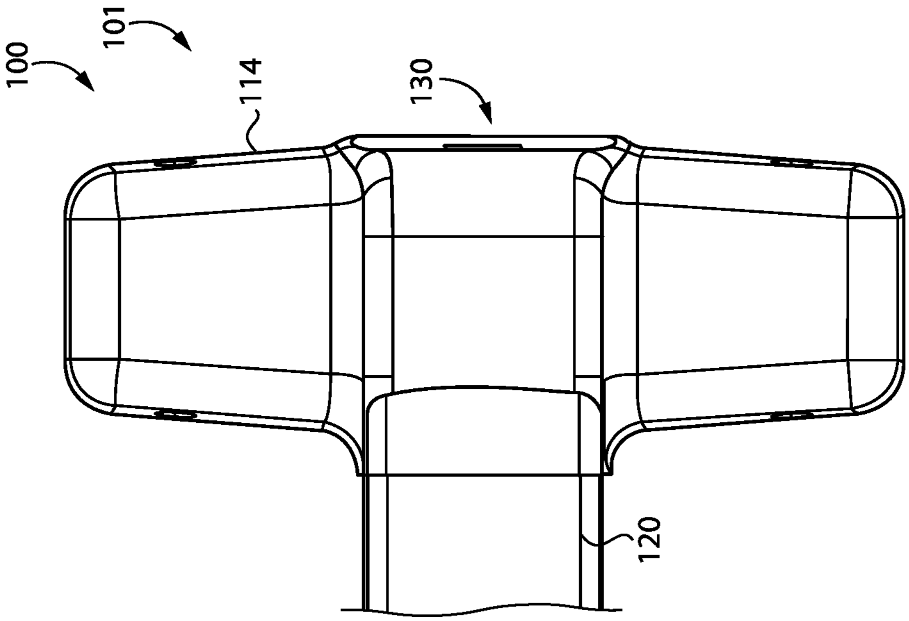
FIG. 5 is a front view of a portion of the exit device with the latchbolt in a retracted position.
Figure 4:
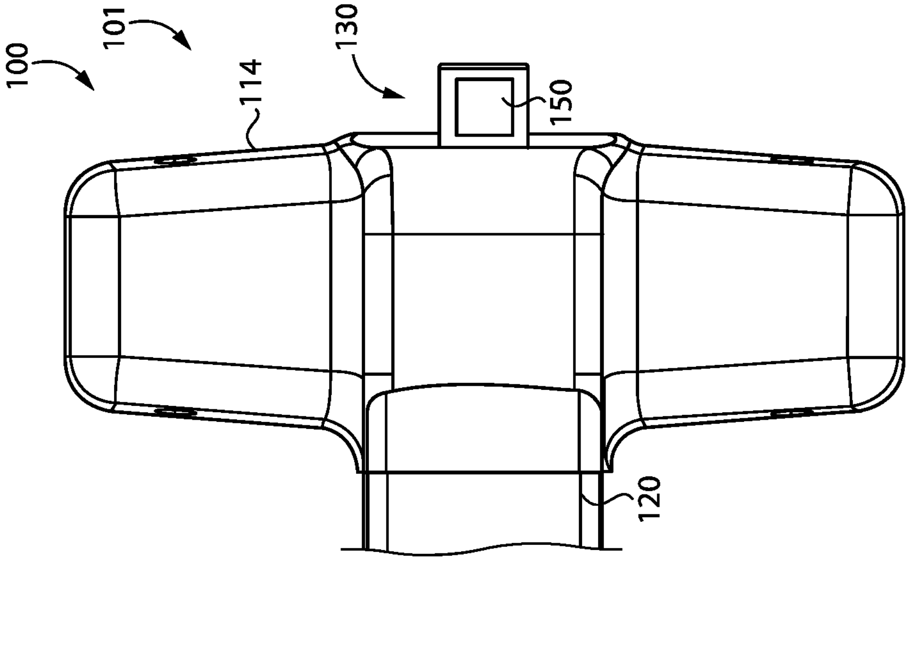
FIG. 4 is a front view of a portion of the exit device with the latchbolt in an extended position.

With additional reference to FIGS. 4 and 5, illustrated therein is a portion of the exit device 100 with the latchbolt 130 in its extended position (FIG. 4), and with the latchbolt in its retracted position (FIG. 5). More particularly, FIGS. 4 and 5 illustrate this portion of the exit device 100 as viewed in a direction orthogonal to the pushbar 120 and/or the door 84. From this vantage point, at least a portion of the indicator 150 is visible when the latchbolt 130 is extended (FIG. 4), and is at least partially obscured from view when the latchbolt 130 is retracted (FIG. 5). With the indicator 150 being more visible when the latchbolt 130 is extended than when the latchbolt 130 is retracted, the indicator 150 may provide a visual indication to aid the touring personnel in determining whether the latchbolt 130 is extended to secure the door 84 in its closed position.

Figure 6:
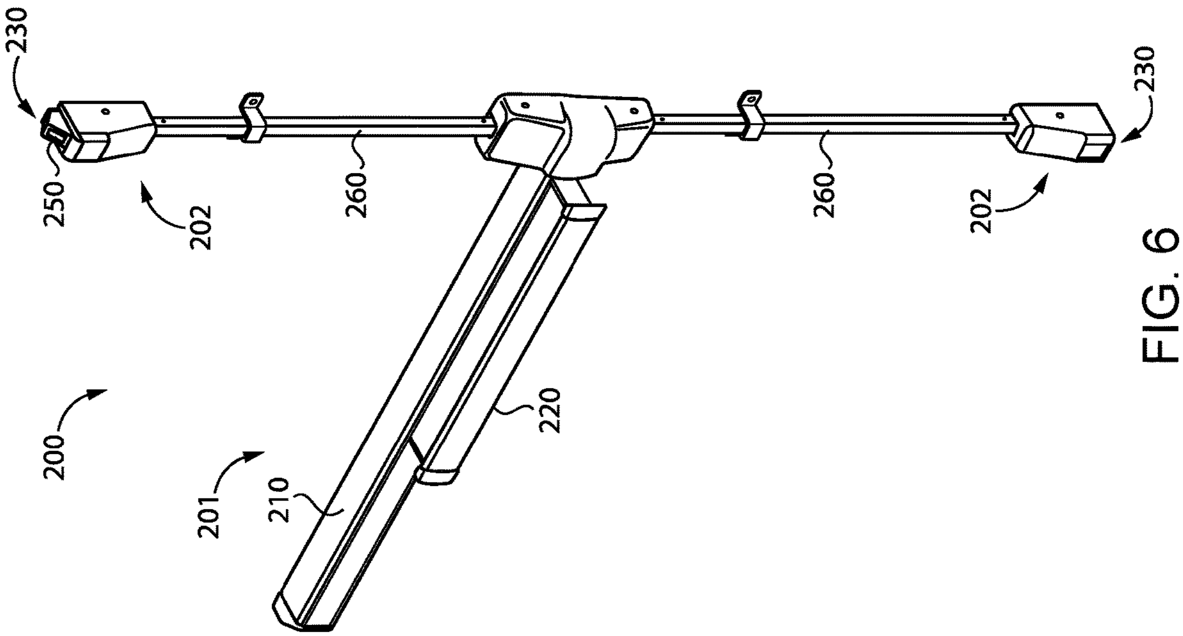
FIG. 6 is a perspective view of an exit device according to certain embodiments.

With additional reference to FIG. 6, illustrated therein is an exit device 200 according to certain embodiments. The exit device 200 is somewhat similar to the exit device 200, and similar reference characters are used to indicate similar elements and features. For example, the exit device 200 includes a pushbar assembly 201 including a mounting assembly 210 and a pushbar 220, which respectively correspond to the pushbar assembly 101 including a mounting assembly 110 and a pushbar 120. In the illustrated form, the exit device 200 is in the form known in the art as a vertical exit device, and further includes at least one remote latch mechanism 202. Each remote latch mechanism includes a corresponding and respective latchbolt 230, and at least one of the latchbolts 230 includes a corresponding and respective indicator 250. While not specifically illustrated in FIG. 5, the pushbar assembly 201 may further include a dogging mechanism along the lines of the above-described dogging mechanism 140.

The illustrated vertical exit device 200 further includes at least one vertically-extending connector 260 connected between the pushbar assembly 201 and the at least one remote latch mechanism 202 such that the pushbar assembly 201 is operable to actuate each remote latch mechanism 202. While the illustrated pushbar assembly 201 lacks a latchbolt, it is also contemplated that a vertical exit device may be provided in a two-point form including a latchbolt near the vertical midpoint of the door 84 and either an upper remote latch mechanism or a lower remote latch mechanism, and that a vertical exit device may be provided in a three-point form including a latchbolt near the vertical midpoint of the door 84 and each of an upper remote latch mechanism and a lower remote latch mechanism.

Figure 7:
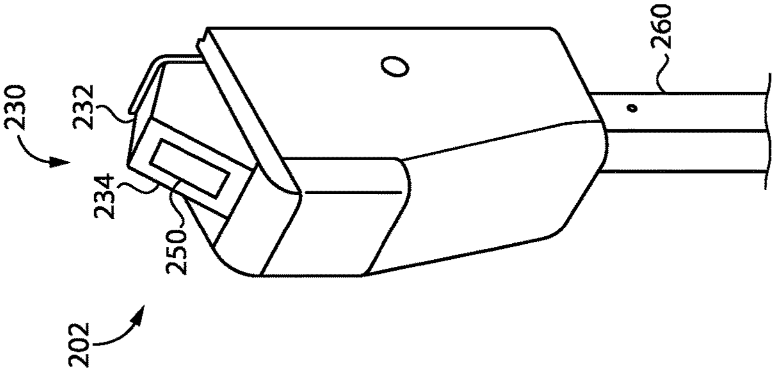
FIG. 7 is a perspective view of a remote latch mechanism according to certain embodiments.

With additional reference to FIG. 7, illustrated therein is one of the remote latch mechanisms 202. As noted above, each remote latch mechanism 202 includes a corresponding and respective latchbolt 230. As with the above-described latchbolt 130, the latchbolt 230 has a rear face 232 and a front face 234, and an indicator 250 is positioned on the front face 234 of at least one latchbolt 230. In certain embodiments, the front face 234 may include a recess 235, and the indicator 250 may be positioned at least partially in the recess 235. It is also contemplated that the indicator may be positioned on a front face 234 that lacks a recess 235. Moreover, the indicator 250 may take any of the example forms described above with reference to the indicator 150, which example forms need not be repeated herein.

Figure 8:
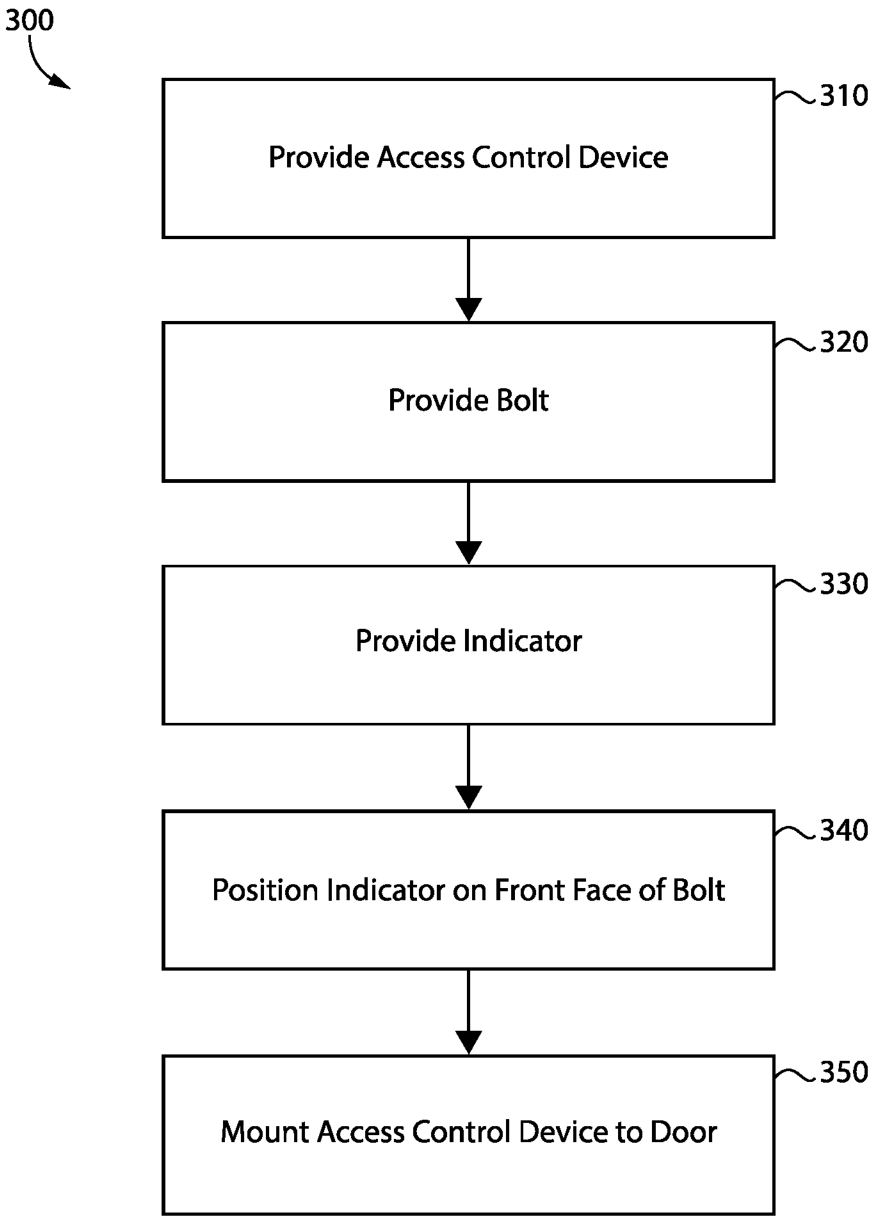
FIG. 8 is a schematic flow diagram of a process according to certain embodiments.

With additional reference to FIG. 8, illustrated therein is an exemplary process 300 according to certain embodiments. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the exit device 100 illustrated in FIGS. 1-5, it is to be appreciated that the process 300 may be performed with access control devices of other forms, including but not limited to the.

In certain embodiments, the process 300 may include block 310, which generally involves providing an access control device including a bolt having a front face that is visible when the bolt is extended. For example, block 310 may involve providing the exit device 100, which includes a bolt 130 having a front face 134 that is visible when the bolt 130 is extended.

In certain embodiments, the process 300 may include block 320, which generally involves providing the bolt with a recess formed in the front face of the bolt. For example, block 320 may involve providing the latchbolt 130 with a recess 135 formed in the front face 134 of the latchbolt. In certain embodiments, block 320 may involve providing the bolt with the recess at the time of manufacture. In other embodiments, block 320 may involve forming (e.g., milling) the recess in an existing bolt. In further embodiments, block 320 may be omitted.

In certain embodiments, the process 300 may include block 330, which generally involves providing an indicator. For example, block 310 may involve providing the indicator 150. As noted above, the indicator 150 may be provided as a rigid member, a flexible member, or in a liquid form, and may be of a different color than the latchbolt 130. In various embodiments, the indicator provided in block 330 may comprise a retroreflective material, a photoluminescent material, and/or a fluorescent material.

The process 300 may include block 340, which generally involves positioning the indicator on the front face of the bolt. For example, block 340 may involve positioning the indicator 150 on the front face 134 of the latchbolt 130. In certain embodiments, such as those that include block 320, block 340 may involve positioning the indicator 150 in the recess 135. In other embodiments, such as those in which block 320 is omitted, block 340 may involve positioning the indicator 150 on a non-recessed front face 134.

The positioning of block 340 may take any of a number of forms, depending on the form in which the indicator 150 is provided. As one example, in embodiments in which the indicator 150 is provided as a rigid member, block 340 may involve adhering the indicator 150 to the front face 134 and/or securing the indicator 150 to the front face 134 with a mechanical fastener. As another example, in embodiments in which the indicator 150 is provided in the form of an adhesive tape, block 340 may involve adhering the adhesive tape to the front face 134. As yet another example, in embodiments in which the indicator 150 is provided in the form of a liquid (e.g., a resin, epoxy, or paint), block 340 may involve applying the liquid to the front face 134 and causing or allowing the liquid to dry and/or cure.

In certain embodiments, the process 300 may include block 350, which generally involves mounting the access control device to a door. For example, block 350 may involve mounting the exit device 100 to the door 84. It is also contemplated that block 350 may be omitted, such as in embodiments in which the access control device is already mounted to the door, or is to be mounted to the door at a later time. When the access control device is mounted to the door, the indicator is visible when the bolt is in an extended position and the door is in a closed position. For example, when the exit device 100 is mounted to the door 84, at least a portion of the indicator 150 is visible when the bolt 130 is extended and the door 84 is closed, as described above.

In certain embodiments, the entire indicator 150 may be visible when the bolt 130 is extended and the door 84 is in its closed position. In other embodiments, only a portion of the indicator 150 may be visible when the bolt 130 is extended and the door 84 is in its closed position. In certain forms, the indicator 150 is visible from a distance of at least twenty feet when the bolt 130 is extended and the door 84 is in its closed position. In certain embodiments, the visible portion of the indicator when the bolt 130 is extended and the door 84 is in its closed position has an area of at least one half of one square inch, or one square inch or greater.

Although two illustrative embodiments of access control devices in the form of a rim format exit device 100 and a vertical exit device 200 have been described and illustrated, it should be appreciated that the concepts described herein may be useful in connection with other forms of access control devices. Additionally, although the illustrated access control devices include actuators in the form of pushbars, it is also contemplated that an actuator may take another form, such as a handle, thumbturn, thumb lever, or the like. Moreover, while the illustrated actuators are provided in the form of manual actuators, it is also contemplated that an actuator according to other embodiments may be electrically activated.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of operating an exit device mounted to a door, wherein the exit device includes a bolt having an indicator mounted on a front face thereof, and wherein a strike is mounted adjacent the door, the method comprising:

pivotably retracting the bolt in response to movement of a pushbar in an egress direction, thereby disengaging the bolt from the strike; and pivotably extending the bolt in response to movement of the pushbar in a second direction opposite the egress direction, thereby engaging a rear face of the bolt with the strike such that the indicator is aligned with the strike and the bolt is positioned between the indicator and the strike such that the indicator is visible when the bolt is in an extended position and the door is in a closed position.

2. The method of claim 1, further comprising:

providing the bolt with a recess formed in the front face; and positioning the indicator on the front face of the bolt, wherein positioning the indicator on the front face of the bolt comprises positioning the indicator in the recess.

3. The method of claim 1, wherein the indicator comprises at least one of a retroreflective material, a fluorescent material, or a photoluminescent material.

4. The method of claim 1, wherein the exit device is a rim format exit device.

5. The method of claim 1, wherein the latch is positioned remotely from the pushbar.

6. The method of claim 1, wherein pivotably retracting the bolt comprises pivoting the bolt about a vertical axis.

7. The method of claim 1, further comprising engaging a front of the bolt with the strike during closing of the door.

8. An exit device, comprising:

a housing assembly comprising a channel member that extends in a longitudinal direction and a header case positioned at one end of the channel member;

a pushbar assembly including a movable pushbar positioned on a front side of the pushbar assembly, wherein the pushbar extends primarily in the longitudinal direction;

a latchbolt operably connected with the pushbar such that the pushbar is operable to move the latchbolt longitudinally from an extended position to a retracted position in response to movement of the pushbar in a rearward egress direction, wherein the latchbolt has a front face; and an indicator positioned on the front face of the latchbolt, wherein the indicator is visible when the latchbolt is in the extended position;

wherein the indicator is positioned on a portion of the latchbolt that projects from the header case when the latchbolt is in the extended position.

9. The exit device of claim 8, wherein the latchbolt comprises a recess formed in the front face; and wherein at least a portion of the indicator is positioned in the recess.

10. The exit device of claim 8, further comprising a mounting assembly to which the pushbar is movably mounted, wherein the mounting assembly includes a channel member and a header case positioned at one end of the channel member; and wherein the latchbolt is at least partially positioned in the header case when in the retracted position.

11. The exit device of claim 8, wherein the latchbolt is positioned remotely of the pushbar assembly and is connected with the pushbar via a vertical connector.

12. The exit device of claim 8, wherein the indicator comprises at least one of a retroreflective material, a fluorescent material, or a photoluminescent material.

13. The exit device of claim 8, wherein the pushbar has a longitudinal axis that extends in a first horizontal direction.

14. The exit device of claim 8, wherein the latchbolt is mounted for pivotal movement between the extended position and the retracted position.

15. An exit device, comprising:

a housing assembly comprising:

a channel member extending along a longitudinal axis; and a header case positioned at one end of the channel member;

a latchbolt mounted in the header case for longitudinal movement between an extended position and a retracted position, wherein a portion of the latchbolt projects from the header case when the latchbolt is in the extended position, and wherein the portion of the latchbolt comprises an indicator that is visible when the latchbolt is in the extended position; and a pushbar operably connected with the latchbolt and configured to drive the latchbolt in the longitudinal direction when the pushbar is depressed in an egress direction transverse to the longitudinal direction.

16. The exit device of claim 15, wherein the portion of the latchbolt comprises a rear face operable to engage a strike and a front face opposite the rear face; and wherein the indicator is positioned on the front face.

17. The exit device of claim 16, wherein the front face comprises a recess, and wherein the indicator is positioned in the recess.

18. The exit device of claim 15, wherein the indicator comprises at least one of a retroreflective material, a photoluminescent material, or a fluorescent material.

19. The exit device of claim 15, wherein, with the latchbolt in the extended position, at least a portion of the indicator is positioned outside the header case.

20. The exit device of claim 15, wherein the latchbolt is mounted for pivotal movement between the extended position and the retracted position.

* * * * *